United States Patent
Farrow et al.

(10) Patent No.: US 9,632,545 B2
(45) Date of Patent: Apr. 25, 2017

(54) DRIVE TRAY

(71) Applicant: Lenovo (Singapore) Pte. Ltd., Singapore (SG)

(72) Inventors: Timothy Samuel Farrow, Cary, NC (US); Ali Kathryn Ent, Garner, NC (US); Shuang Li, Shenzhen (CN); Albert Vincent Makley, Morrisville, NC (US); Sean Hilliard, Anderson, SC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 168 days.

(21) Appl. No.: 14/229,883

(22) Filed: Mar. 29, 2014

(65) Prior Publication Data

US 2015/0277510 A1 Oct. 1, 2015

(51) Int. Cl.
*G06F 1/18* (2006.01)
(52) U.S. Cl.
CPC .................. *G06F 1/187* (2013.01)
(58) Field of Classification Search
CPC ...................................................... G06F 1/183
See application file for complete search history.

(56) References Cited

U.S. PATENT DOCUMENTS

| | | | |
|---|---|---|---|
| 5,557,499 A * | 9/1996 | Reiter ..................... | G06F 1/184 312/223.2 |
| 7,626,810 B1 * | 12/2009 | Kim ........................ | G06F 1/187 361/679.33 |
| 8,474,804 B2 * | 7/2013 | Masterson ............ | F16F 1/3732 267/141 |
| 2006/0017306 A1 * | 1/2006 | Smith ..................... | B60J 5/0418 296/146.7 |
| 2007/0230110 A1 * | 10/2007 | Starr ....................... | G11B 33/10 361/679.31 |
| 2007/0267951 A1 * | 11/2007 | Lin ......................... | G06F 1/183 312/223.1 |
| 2007/0279860 A1 * | 12/2007 | Zheng ..................... | G06F 1/183 361/679.33 |
| 2009/0161309 A1 * | 6/2009 | Yang .................. | G11B 17/0407 361/679.39 |
| 2010/0002366 A1 * | 1/2010 | Pav ......................... | G06F 1/187 361/679.02 |
| 2010/0266334 A1 * | 10/2010 | Chen ....................... | G06F 1/183 403/320 |

(Continued)

*Primary Examiner* — Courtney Smith
*Assistant Examiner* — Keith Depew
(74) *Attorney, Agent, or Firm* — Brian J. Pangrle (57) ABSTRACT

An assembly can include a processor; memory accessibly by the processor; a drive tray chassis; a drive tray positioned in the drive tray chassis where the drive tray includes a first side wall, a second side wall, a member coupled to the first side wall and the second side wall that defines a dimension of a first drive bay that extends from the first side wall to the second side wall, and an intermediate member that defines a dimension of a second drive bay that extends from the intermediate member to the second side wall wherein the dimension of the second drive bay is less than the dimension of the first drive bay; and a drive accessible by the processor and positioned in one of the first drive bay and the second drive bay. Various other apparatuses, systems, methods, etc., are also disclosed.

18 Claims, 9 Drawing Sheets

(56) References Cited

U.S. PATENT DOCUMENTS

| | | | |
|---|---|---|---|
| 2012/0173732 A1* | 7/2012 | Sullivan | G06F 1/1607 709/226 |
| 2012/0299453 A1* | 11/2012 | Dunham | G06F 1/183 312/244 |
| 2013/0033813 A1* | 2/2013 | Ling | G06F 1/187 361/679.34 |
| 2014/0192503 A1* | 7/2014 | Chen | G06F 1/183 361/807 |
| 2014/0240908 A1* | 8/2014 | Kwon | G06F 1/183 361/679.02 |
| 2015/0116922 A1* | 4/2015 | Lin | G06F 1/187 361/679.31 |

* cited by examiner

DRIVE TRAY

TECHNICAL FIELD

Subject matter disclosed herein generally relates to technology for a computing system.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

BACKGROUND

A computing system can include various components such as a processor, memory and one or more storage devices. A storage device may be positioned in a bay of a computing system. For example, a storage device may be a media drive that may be positioned in bay via one or more mechanisms.

SUMMARY

An assembly can include a processor; memory accessibly by the processor; a drive tray chassis; a drive tray positioned in the drive tray chassis where the drive tray includes a first side wall, a second side wall, a member coupled to the first side wall and the second side wall that defines a dimension of a first drive bay that extends from the first side wall to the second side wall, and an intermediate member that defines a dimension of a second drive bay that extends from the intermediate member to the second side wall wherein the dimension of the second drive bay is less than the dimension of the first drive bay; and a drive accessible by the processor and positioned in one of the first drive bay and the second drive bay. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

Figure 1:
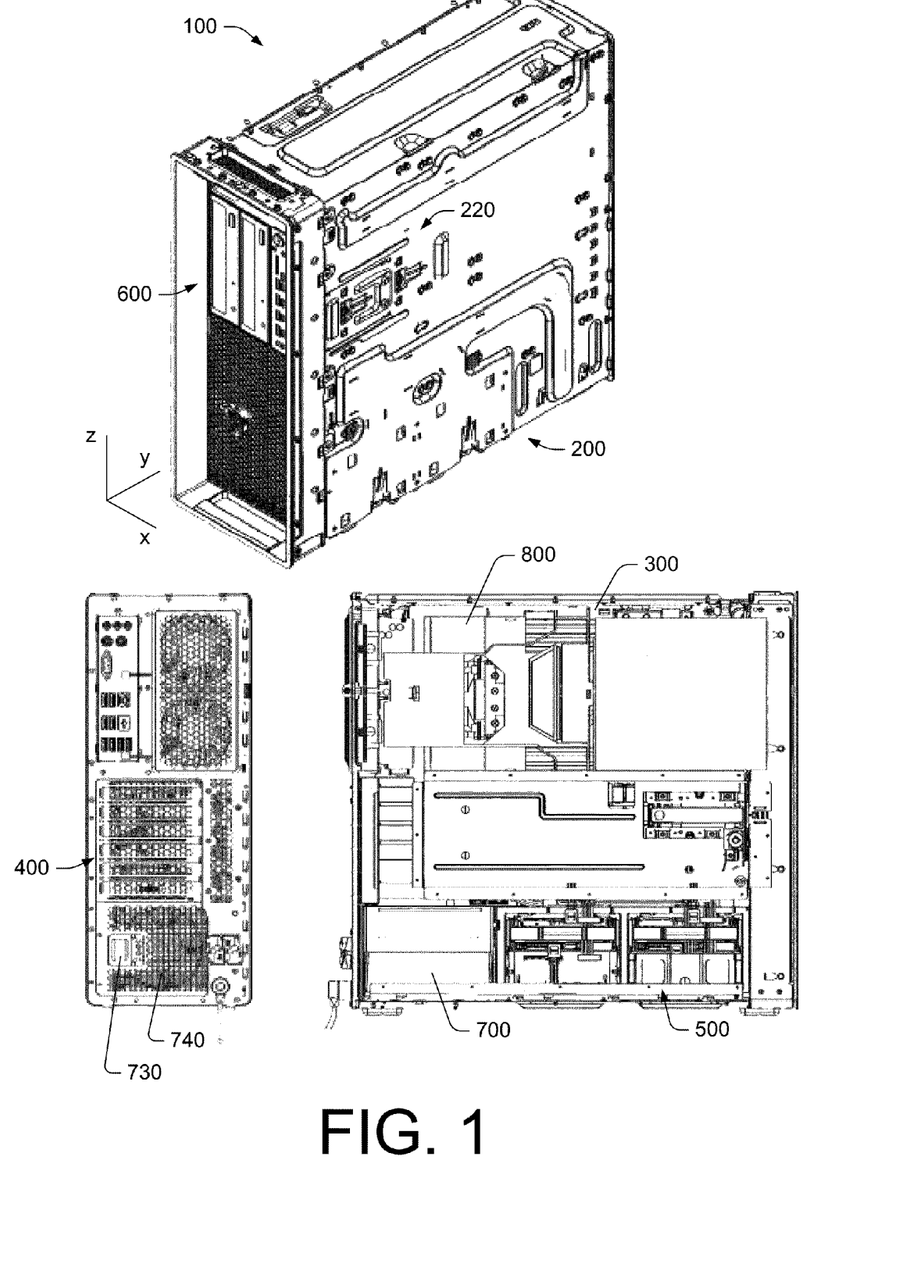
FIG. 1 is a series of diagrams of views of an example of a computing system.

FIG. 1 shows an example of a computing system 100. As an example, the computing system 100 may be a workstation, for example, configured to handle information, which may include one or more of processing information, storing information, receiving information and transmitting information. The computing system 100 can include connectors 190, for example, to connect the computing system 100 to one or more peripherals, networks, etc. As an example, the computing system 100 may include wireless circuitry for wireless connection to one or more peripherals, networks, etc.

As shown in the example of FIG. 1, the computing system includes 100 includes a chassis 200, a board 300, slots 400, bays 500, bays 600, a power supply unit 700 and air flow features 800. As an example, a cover may be fitted to the chassis 200, which may include one or more panels. As an example, a panel may be a lockable panel where, in an unlocked state, it may be removed for access to various components in the computing system 100. As an example, various components may be configured for tool-less installation and removal. As an example, a tool-less configuration may include one or more handles, grips, buttons, levers, etc. that may be manipulated by one or more fingers of a human hand (e.g., or hands). As an example, a tool-less configuration may include guides, for example, for sliding in and sliding out components with respect to the chassis 200.

In the example of FIG. 1, the computing system 100 is shown with respect to a Cartesian coordinate system (x, y, z) and as including a back end and a front end disposed substantially in respective x,z-planes, a top end and a bottom end disposed substantially in respective x,y-planes and a left side and a right side disposed substantially in respective y,z-planes. As to an orientation with respect to gravity, as an example, the computing system 100 may be oriented on its bottom end where gravity may be aligned with the z-axis or, for example, the computing system 100 may be oriented on one of its sides where gravity may be aligned with the x-axis (e.g., with the left side facing upward and the right side facing downward).

In the example of FIG. 1, the chassis 200 includes a mechanism for limiting movement of the board 300 (e.g., at least along the y-axis). As shown, the board 300 may be positioned substantially in a y,z-plane and may include various slots 400 for receipt of one or more components (e.g., cards, etc.), which may extend outwardly from the board 300 (e.g., at least in part along the x-axis).

As to the bays 500 and the bays 600, these may be defined at least in part by the chassis 200. As shown, the bays 500 and the bays 600 may include one or more bays accessible via the front end of the computing system 100 (see, e.g., the bays 600) and may include one or more bays accessible via one or both of the sides of the computing system 100 such as, for example, the left side of the computing system 100 (see, e.g., the bays 500).

In the example of FIG. 1, the computing system 100 includes the power supply unit 700, which includes a connector 730 for receipt of power (e.g., via a power cord) and which may include a fan 740 (e.g., or fans). The power supply unit 700 may provide power to various components of the computing system 100.

As shown in the example of FIG. 1, the chassis 200 includes various openings that may facilitate flow of air. In operation, the front end and the back end of the computing system 100 may be positioned with respective clearances from other environmental structures (e.g., shelves, desks, walls, equipment, etc.), for example, to not unduly hinder flow of air. Air flow through the computing system 100 may be guided by one or more of the air flow features 800. As an example, the computing system 100 may include one or more baffles. As an example, the computing system 100 may include one or more fans. As an example, fans may be operated in series, for example, where air moved by one fan includes air moved by another fan. For example, a fan disposed in a first x,z-plane of the computing system 100 may move air at least in part along the y-axis (e.g., into the computing system 100) where another fan disposed in a second x,z-plane of the computing system 100 receives at least a portion of that air and moves it at least in part along the y-axis (e.g., out of the computing system 100). As mentioned, the power supply assembly 700 may include the fan 740 (e.g., or fans).

In the example of FIG. 1, the board 300 of the computing system 100 can include one or more processors and memory accessible by at least one of the one or more processors. One or more of the bays 500 and/or the bays 600 of the computing system 100 may include one or more storage devices, which may be accessible by at least one of the one or more processors.

As an example, a computing system may include various types of bays (e.g., consider a bay for a component specified at least in part by a 5.25 inch standard, a bay for a component specified at least in part by a 3.5 inch standard, a 2.5 inch standard, etc.). In the example of FIG. 1, the bays 500 are shown as being accessible via a side of the computing system 100, for example, upon removal, movement, etc. of a panel of the computing system 100. In the example of FIG. 1, the bays 500 are shown as being bays for one or more drives that may be positioned in one or more drive trays. For example, the bays 500 may be defined by one or more drive tray chassis configured to receive one or more drive trays. In such an example, a drive tray may include one or more features that cooperate with one or more features of a drive tray chassis (e.g., rails, guides, posts, etc.).

Figure 2:
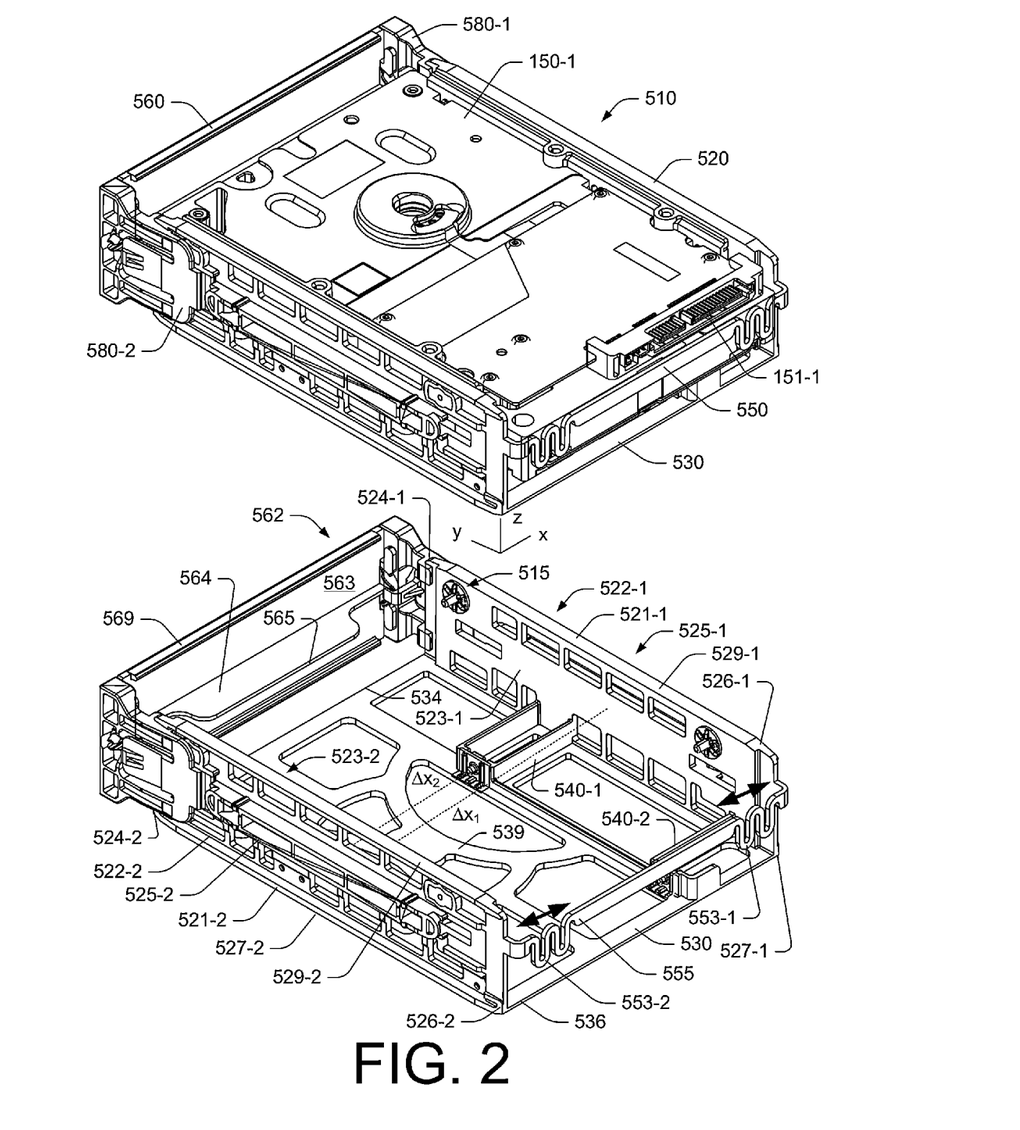
FIG. 2 is a series of diagrams of views of an example of an assembly that includes a drive tray.

FIG. 2 shows an example of a drive 150-1 that includes a connector 151-1 and that includes mounting features and an example of a drive tray assembly 510 that includes a drive tray 520 that includes first side wall 521-1 and a second side wall 521-2 that define a width of a drive tray bay that may receive the drive 150-1, for example, with support from one or more components 515 (e.g., posts seated in resilient grommets or other structures that may be received by openings in the first side wall 521-1 and the second side wall 521-2).

In the example of FIG. 2, the drive tray 520 includes one or more members 530 and 550. For example, the member 530 may be a base and the member 550 may be a resilient member that may biasably support the first side wall 521-1 and the second side wall 521-2. For example, the member 550 may include one or more expandable and contractable portions 553-1 and 553-2 and a member 555 disposed therebetween. In such an example, the side walls 521-1 and 521-2 may be flexed away from each other to increase a distance therebetween, for example, to facilitate receipt of a drive such as the drive 150-1. In such an example, where the drive tray 530 includes the member 530, the member 530 may be bendable, for example, capable of curving to accommodate flexing of the walls 521-1 and 521-2. As an example, the member 530 may include one or more struts 539, which may be arranged in a manner that may provide integrity for bending (e.g., distribution of bending forces in multiple directions). As shown in the example of FIG. 2, the member 530 includes a front end 534 and a back end 536 with struts including the strut 539 positioned therebetween.

As an example, a member may be a cross-member that may be operatively coupled to the first side wall 521-1 and operatively coupled to the second side wall 521-2. As an example, a cross-member may be integral to at least one of the first side wall 521-1 and the second side wall 521-2.

As an example, a member may include at least one serpentine portion (e.g., accordion portion) that can expand and contract. In such an example, the at least one serpentine portion may be formed as part of a shape of a member, which may optionally be integral to a drive tray. For example, a drive tray may be formed via molding (e.g., injection molding) to include a member that includes at least one serpentine portion.

In the example of FIG. 2, the side wall 521-1 includes an outward facing surface 522-1, an inward facing surface 523-1, an end 524-1, an end 526-1, a lower edge 527-1 and an upper edge 529-1 and the side wall 521-2 includes an outward facing surface 522-2, an inward facing surface 523-2, an end 524-2, an end 526-2, a lower edge 527-2 and an upper edge 529-2. As shown in the example of FIG. 2, the side wall 521-2 includes a feature 525-2 that extends outward from the surface 522-2, which may be a feature that cooperates with a feature of a drive tray chassis. As indicated by an arrow and reference numeral 525-1, the side wall 521-1 may include a feature that may cooperate with a feature of a drive tray chassis.

In the example of FIG. 2, the drive tray 520 is configured for receipt of one or more drives. For example, the drive tray 520 may receive two drives where the two drives differ with respect to a width-wise dimension. As shown in FIG. 2, the drive tray 520 includes one or more intermediate members 540-1 and 540-2 that define a dimension of a second drive bay that extends from the one or more intermediate members 540-1 and 540-2 to the second side wall 521-2 (e.g., to one or more features that may extend inward from the surface 523-2 of the second side wall 521-2). In such an example, the dimension of the second drive bay is less than the dimension of the first drive bay (e.g., the bay that is shown as being in receipt of the drive 150-1).

As shown in the example of FIG. 2, the intermediate members 540-1 and 540-2 extend from the first side wall 521-1 and are coupled to the member 530. In such an arrangement, bendability of the member 530 may be imparted via an arrangement of struts that extend at least partially over a width from ends of the intermediate members 540-1 and 540-2 to the second side wall 521-2. For example, the intermediate members 540-1 and 540-2 may increase rigidity of a portion of the member 530 where compensation (e.g., increased flexibility) is made up for such an increase in rigidity over another portion of the member 530 (see, e.g., section of the member that includes curved struts).

As mentioned, the drive tray 520 may be configured to flex and bend, for example, to facilitate insertion and/or removal of one or more drives from one or more drive bays defined by the drive tray 520. As an example, such deformation may occur without certain components attached to the drive tray 520. For example, consider a handle 560 that is rotatably supported by the extensions 580-1 and 580-2 that extend from the ends 524-1 and 524-2 of the first and the second side walls 521-1 and 521-2, respectively. Such a handle may be configured for ease of removal and attachment, for example, optionally without use of tools. For example, the extensions 580-1 and 580-2 may clip to the respective walls 521-1 and 521-2, optionally with the handle 560 disposed between the extensions 580-1 and 580-2. In such an example, the handle 560 and the extensions 580-1 and 580-2 may be attachable and removable as a sub-assembly with respect to the drive tray 520. As an example, a method of assembly may include positioning the drive 150-1 in a bay of the drive tray 520 and then coupling the handle 560 to the drive tray 520, optionally as a sub-assembly that includes at least one of the extensions 580-1 and 580-2.

In the example of FIG. 2, the handle 560 is shown as including a front face 562, a back face 563, a grip 564 that extends inwardly from the back face 563, an edge 565 of the grip 564 and an upper edge 569. In such an example, the handle 560 may be rotated about a pivot axis (e.g., defined in part by the extensions 580-1 and 580-2) such that the grip 564 is accessible by fingers of a hand, for example, to pull the assembly 510 out of a drive tray chassis (e.g., to translate the assembly 510, the drive tray 520, etc.). As an example, the front face 562 of the handle 560 may include a feature (see, e.g., the feature 561 of FIG. 5) that may indicated where pressure may be applied to cause the handle to rotate 560 and expose the grip 564 (e.g., to position the grip 564 for gripping by a finger or fingers of a hand).

Figure 3:
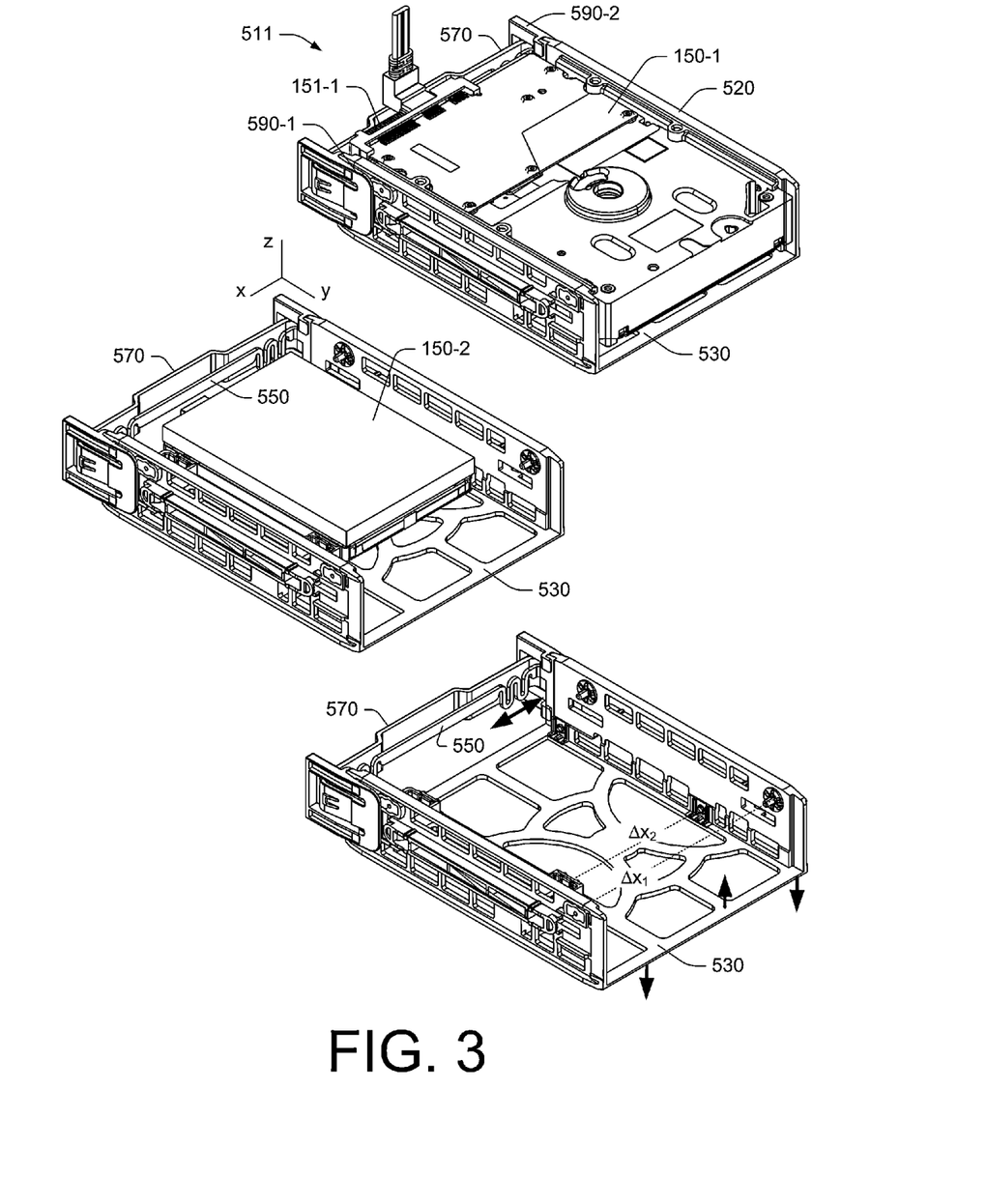
FIG. 3 is a series of diagrams of views of an example of an assembly that includes a drive tray.

FIG. 3 shows an example of another assembly 511, which can include the drive tray 520 (e.g., as described with respect to FIG. 2). In FIG. 3, the assembly 511 includes the drive 150-1 and another drive 150-2. In the example of FIG. 3, the assembly 511 is shown with a handle 570, noting that, as an option, the handle 560 may be included (e.g., alternatively or additionally) together with the extensions 580-1 and 580-2. In comparison to the assembly 510, with reference to the member 550, the handle 570 is shown as being operatively coupled to the drive tray 520 at a connector end (e.g., where a connector 151-1 of the drive 150-1 and a connector 151-2 of the drive 150-2 may be positioned).

As an example, the handle 570 may include extensions 590-1 and 590-2, which may optionally be integral to the handle 570. The extensions 590-1 and 590-2 may be configured to clip onto the side walls 521-1 and 521-2, respectively, of the drive tray 520, optionally in a tool-less manner. Such extensions may be attachable and removable, for example, to configure an assembly that includes the drive tray 520.

In the example of FIG. 3, an L-shaped connector is illustrated as being coupled to the connector 151-1 of the drive 150-1. As an example, another L-shaped connector may be coupled to the connector 151-2 of the drive 150-2. Referring again to FIG. 1, drive tray assemblies are shown as being disposed in the computing system 100 where such assemblies include at least one assembly such as the assembly 510 of FIG. 2 and at least one assembly such as the assembly 511 of FIG. 3. As an example, a computing system may include one or more assemblies, which may include an assembly such as the assembly 510, an assembly such as the assembly 511, a drive tray such as the drive tray 520, etc.

As an example, the assembly 511 may be considered to be an exposed connector assembly while the assembly 510 may be considered to be a blind connector assembly. As an example, an exposed connector assembly may include at least one drive received by a drive tray where a connector end of at least one of the at least one drive is facing a front end of the exposed connector assembly; whereas, a blind connector assembly may include at least one drive received by a drive tray where a connector end of at least one of the at least one drive is facing a back end of the blind connector assembly. As an example, a drive tray may be configurable to be inserted into a drive tray chassis in two different orientations, for example, an exposed connector orientation or a blind connector orientation.

Figure 4:
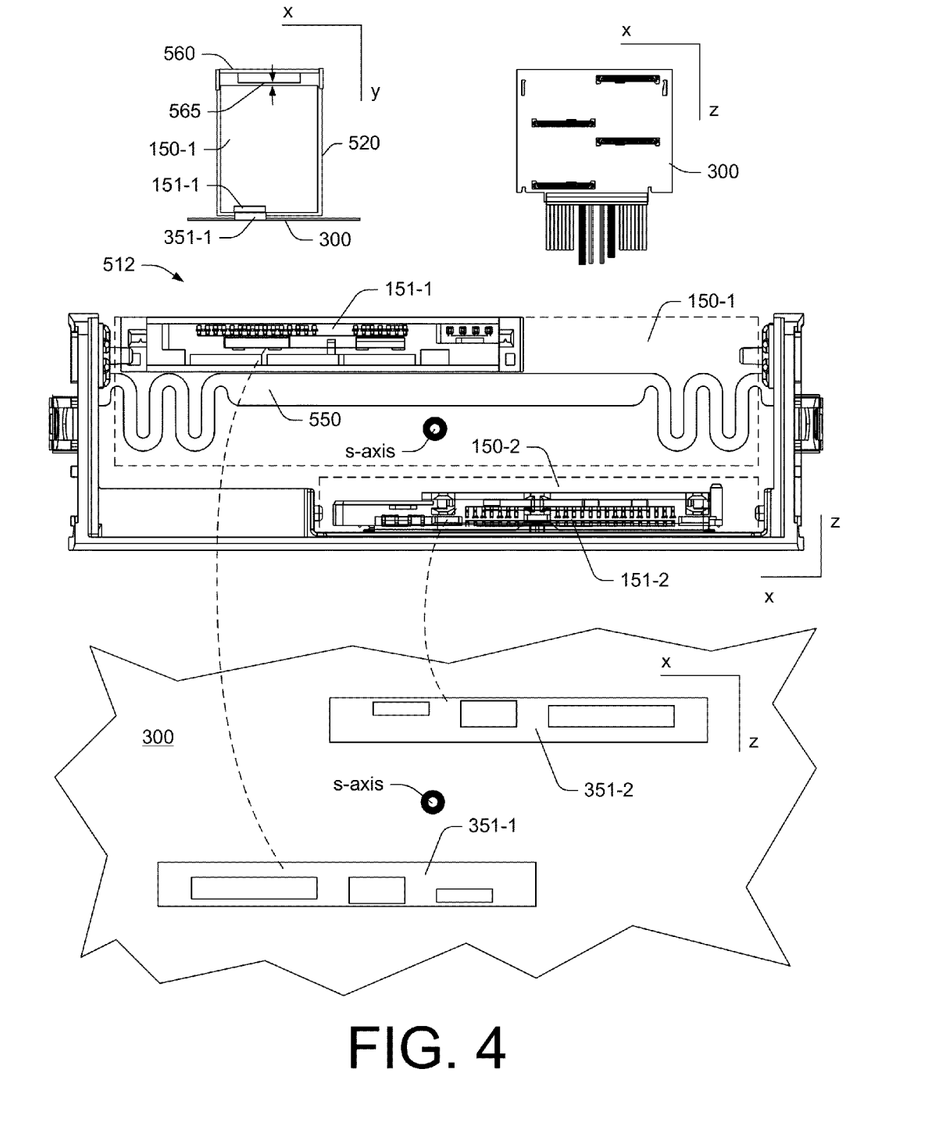
FIG. 4 is a series of diagrams that include a view of an example of an assembly and a view of examples of one or more connectors.

FIG. 4 shows an example of an assembly 512 that includes two drives 150-1 and 150-2 received by the drive tray 520 and an example of a board 300 that includes one or more connectors 351-1 and 351-2. As an example, in a blind connection arrangement, the assembly 512 may be oriented such that the connectors 151-1 and 151-2 are oriented with respect to the connectors 351-1 and 351-2, respectively. In such an example, sliding the assembly 512 into a drive tray chassis of a computing system such as the computing system 100 of FIG. 1 may act to operatively coupled connectors.

As an example, where the board 300 of FIG. 4 is a motherboard (e.g., a circuit board that may include one or more sockets that can receive one or more processors), the drives 150-1 and 150-2 may be operatively coupled to circuitry of the motherboard without intervening cables (e.g., a cableless coupling of one or more drives to a motherboard).

FIG. 4 also includes a diagram of the drive 150-1 in the drive tray 520 oriented with respect to the board 300. For reference, a coordinate system is shown in FIG. 4 (see, e.g., x, y, z axes and/or directions).

As an example, the grip 564 of the handle 560 may act in part as a stop, for example, to limit movement of one or more drives in a drive bay defined by a drive tray. For example, the edge 565 of the grip 564 may face inwardly when the handle 560 is in a closed orientation. In such an example, the edge 565 may define a clearance (e.g., along the y-axis) with respect to a surface of a drive (e.g., the drive 150-1), which may be a larger drive with respect to two different sized drive bays of a drive tray. As an example, as a drive tray is inserted into a drive tray chassis, upon contact of a connector of a drive with another connector, the drive may translate in the drive tray. As an example, where the drive tray includes a handle such as the handle 560, the edge 565 of the grip 564 may act to limit translation of the drive in the drive tray and provide a point of contact for appropriate force against the drive to couple a connector of the drive with another connector. As an example, the edge 565 of the handle 560 may function as a stop, for example, where it stops movement of a drive in a drive tray, for example, where a system may be exposed to shock, vibration, shifting, etc.

As an example, the computing system 100 of FIG. 1 may be oriented in one or more orientations with respect to gravity. As an example, the left side of the computing system 100 may be facing upward such that an assembly such as the assembly 510 of FIG. 2 is oriented with a connector end of one or more drives facing downward. In such an example, acceleration of gravity may act upon the mass of a drive to maintain the drive in a coupled state with respect to a connector, which may be a connector coupled to a board such as the board 300 of FIG. 1 or FIG. 4.

As an example, the computing system 100 may be oriented with the top facing upward with respect to gravity. In such an example, acceleration of gravity may act orthogonally to a translation direction of a drive tray in a drive tray chassis of the computing system 100. As an example, to couple a connector of a drive to a connector of a board, force may be applied to a handle such as the handle 560. In such an example, an edge of the handle (see, e.g., the edge 565 of the grip 564) may contact a surface of the drive for transfer of force to couple the connectors. For example, in an unflexed state, a clearance may exist between the edge of the handle and the surface of the drive whereas in a flexed state, responsive to application of force to the handle, the clearance may be reduced such that the edge of the handle contacts the surface of the drive (e.g., for transfer of force).

In the example assembly 512 of FIG. 4, the drives 150-1 and 150-2 are offset and may include a clearance therebetween for airflow, heat transfer, vibration isolation, etc. For example, with respect to an x,z-plane, the drives 150-1 and 150-2 are offset such that their connectors 151-1 and 151-2 are offset. As an example, if the connectors 150-1 and 150-2 and the connectors 351-1 and 351-2 are interchangeable with respect to each other (e.g., connectors according to a particular specification, etc.), the assembly 512 may be flipped by 180 degrees (e.g., +/−) and still be operatively coupled to the connectors 351-1 and 351-2 of the board 300. For example, orienting the assembly 512 in a 180 degree orientation may allow for the connector 151-1 of the drive 150-1 to couple to the connector 351-2 of the board 300 and may allow for the connector 151-2 of the drive 150-2 to couple to the connector 351-1 of the board 300. In FIG. 4, a symmetry axis (e.g., rotational symmetry for 0 and 180 degrees) is illustrated with respect to the assembly 512 and with respect to the board 300.

As an example, the drive tray 520 may include features that intercooperate with features of a drive tray chassis. In such an example, the features may allow for orienting the drive tray 520 in two or more orientations with respect to the drive tray chassis. For example, consider a front-back orientation; a back-front orientation; a 0 degree orientation; a 180 degree orientation; a front-back, 0 degree orientation; a back-front, 0 degree orientation; a front-back, 180 degree orientation; and a back-front, 180 degree orientation. In such an example, the drive tray 520 may include no drives, one drive or two drives. Where at least one drive is included in the drive tray 520 (e.g., as an assembly), an orientation may be a blind orientation or an exposed orientation. As an example, a blind orientation may include the handle 560 (e.g., with extensions 580-1 and 580-2) while an exposed orientation may include the handle 570 (e.g., with extensions 590-1 and 590-2).

As an example, the drive tray 520 may allow for a mix-and-match approach to selection of drives and orientation of drives for a computing system such as the computing system 100 of FIG. 1 (e.g., with respect to one or more drive tray chassis thereof).

Figure 5:
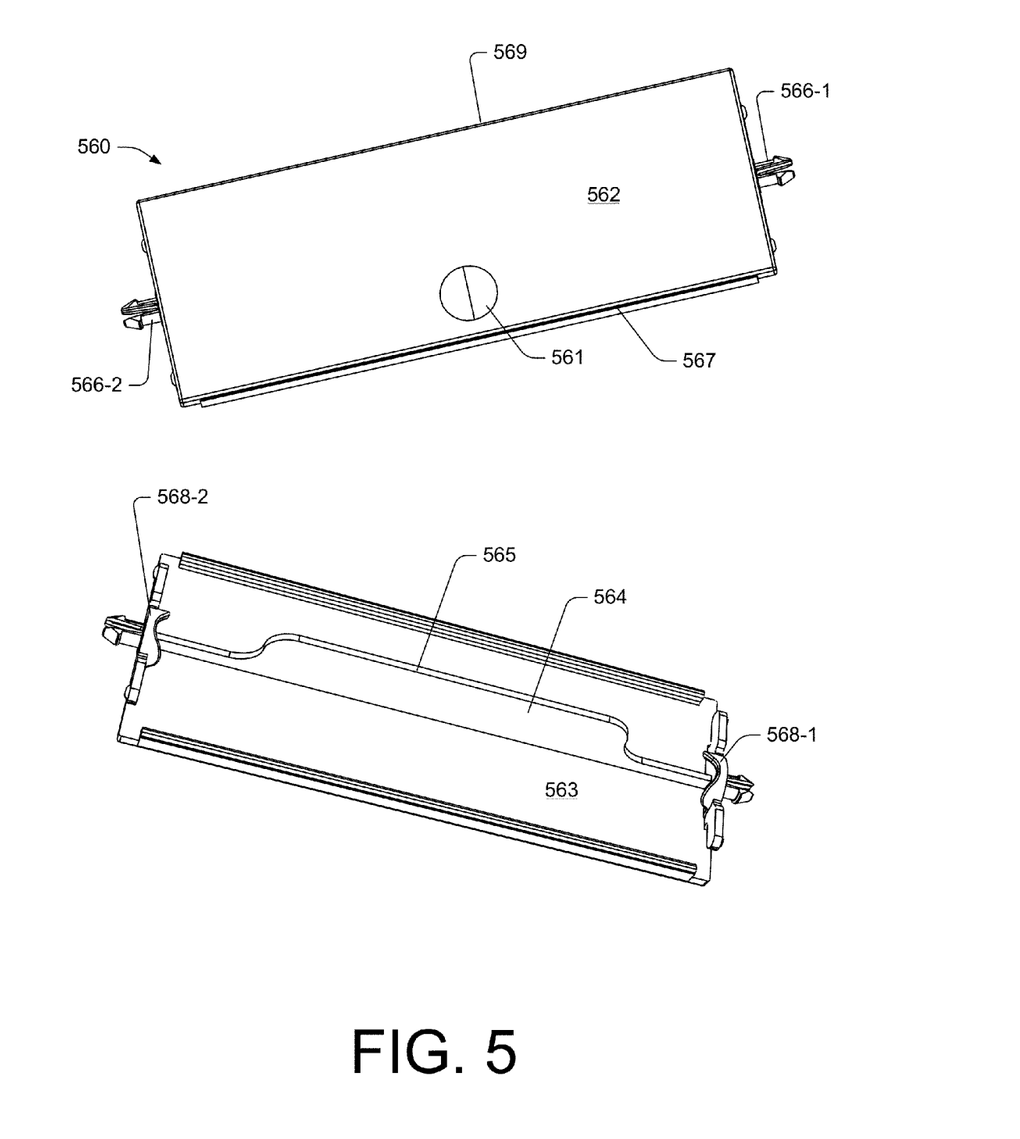
FIG. 5 is a series of diagrams of views of an example of a handle.

FIG. 5 shows two perspective views of the handle 560 of the assembly 510 of FIG. 2. As shown, the handle 560 includes a face 562 that may include a depression, for example, to facilitate application of force to the handle 560 to rotate the handle 560 about a pivot axis, which may expose the grip 564 (e.g., rotate the grip 564 with respect to a drive tray). The handle 560 includes posts 566-1 and 566-2, edges 567 and 569, and features 568-1 and 568-2 that are shaped to guide and limit rotation of the handle 560.

Figure 6:
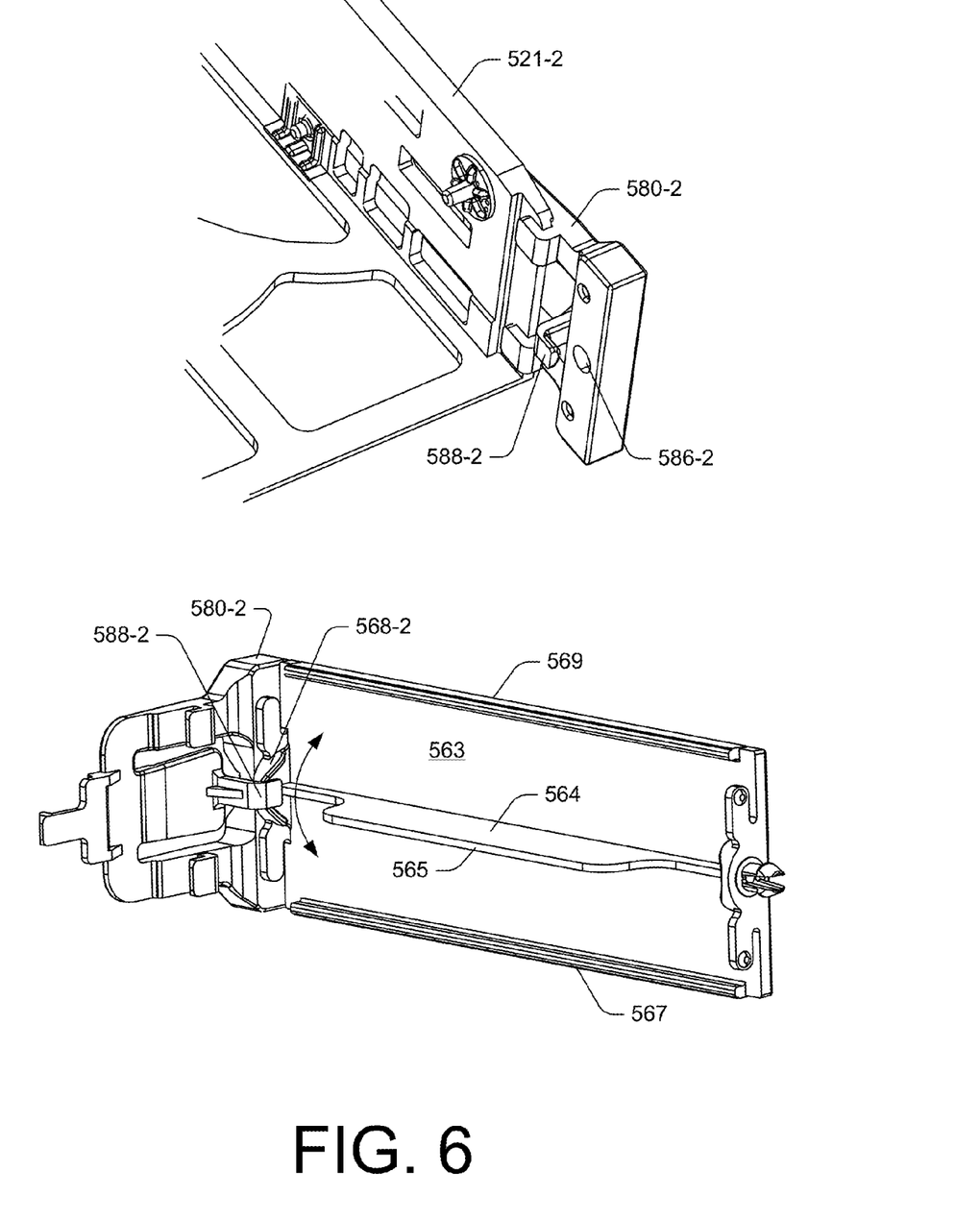
FIG. 6 is a series of diagrams of views of portions of an example of an assembly.

FIG. 6 shows an example of a portion of the assembly 510 of FIG. 2, particularly a portion of the drive tray 520 and the extension 580-2. As shown, the extension 580-2 is operatively coupled to the side wall 521-2 and the extension 580-2 includes a socket 586-2 and a guide member 588-2. As an example, divots may be included on a surface of the extension 580-2, which may intercooperate with bumps that extend from a surface of the handle 560 (e.g., to snap lock the handle 560 in a closed orientation with respect to the extensions 580-1 and 580-2).

As shown in the example of FIG. 6, the post 566-2 may be received at least partially by the socket 586-2 of the extension 580-2 and positioned such that the guide member 588-2 intercooperates with the feature 568-2 of the handle 560. For example, the guide member 588-2 may intercooperate with the feature 568-2 to limit rotation of the handle 560 in a manner that properly positions the grip 564 of the handle 560 (e.g., for gripping with one or more fingers).

As an example, a method may include rotating a handle responsive to application of pressure (e.g., optionally sufficient to release a snap lock) where the handle rotates to a position limited by a guide member received by a guide feature. In such an example, a grip of the handle may be positioned from a direction inwardly facing to a direction more generally upwardly facing, for example, for ease of gripping by one or more fingers of a hand. In such an example, where the handle is operatively coupled to a drive tray seated in a drive tray chassis, force applied to the grip may cause the drive tray to translate outwardly from the drive tray chassis.

Figure 7:
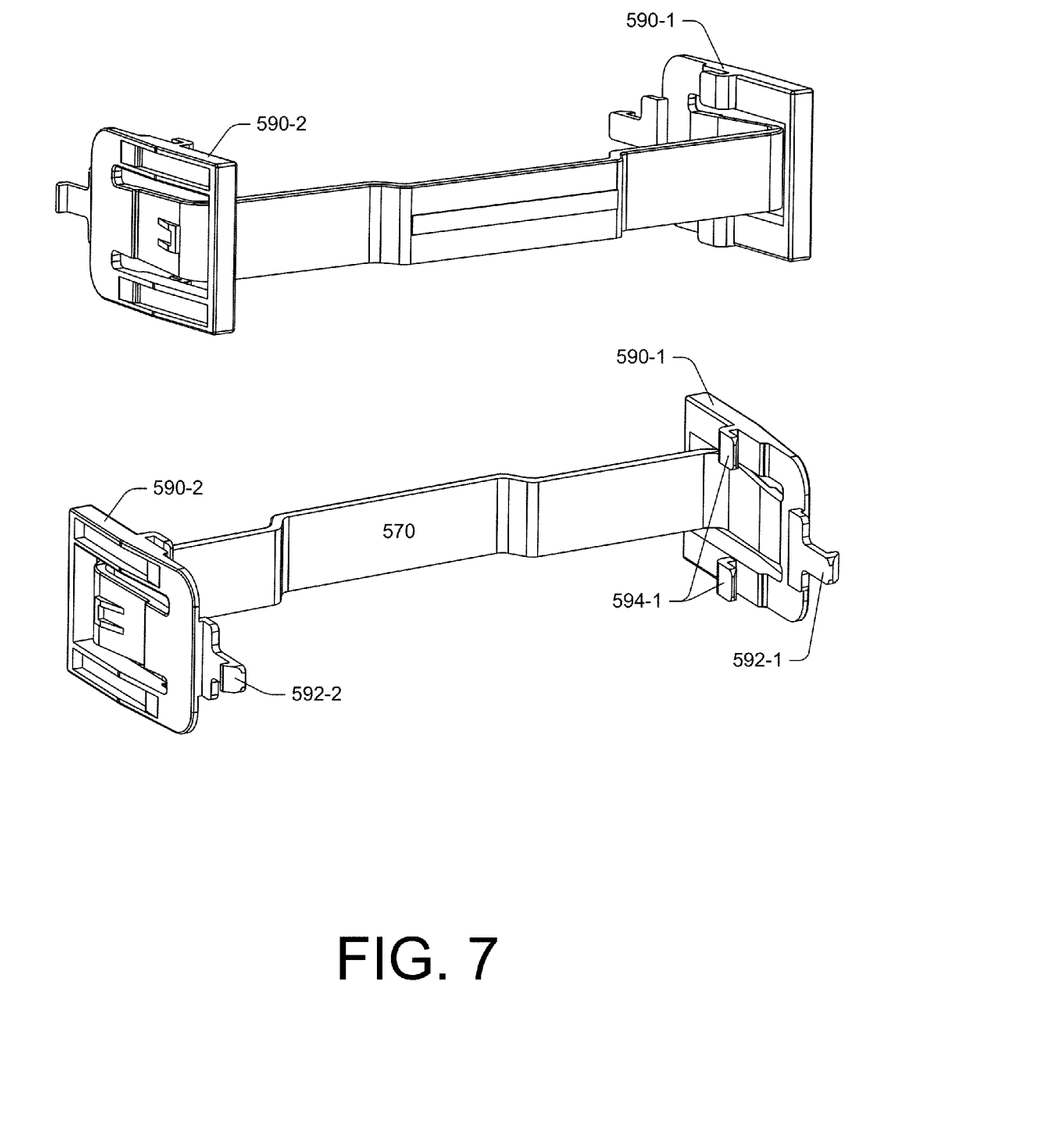
FIG. 7 is a series of diagrams of views of an example of a handle.

FIG. 7 shows two perspective views of the handle 570 of the assembly 511 of FIG. 3. As shown, the extensions 590-1 and 590-2 may include features 592-1, 592-2, 594-1 and 594-2 that may be configured to operatively couple the extensions 590-1 and 590-2 to a drive tray. As an example, the coupling force may be sufficient to carry the drive tray with two drives positioned therein. As an example, such a handle may be attachable and removable without tools (e.g., a tool-less handle that may form part of a tool-less drive tray assembly).

Figure 8:
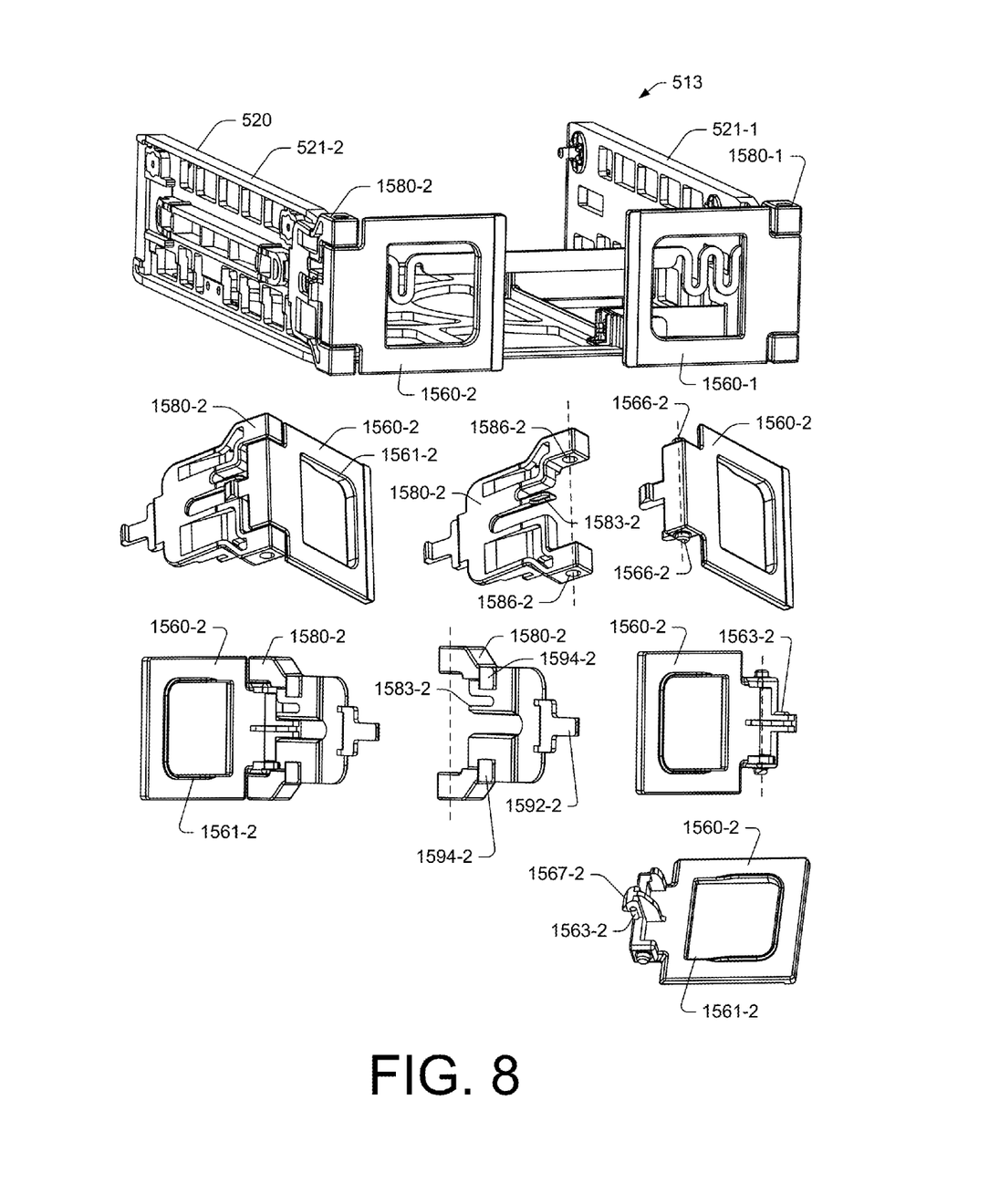
FIG. 8 is a series of diagrams of views of an example of an assembly that includes examples of extensions and handles.

FIG. 8 shows a perspective view of an example of an assembly 513 and various perspective views of components thereof. For example, the assembly 513 includes the drive tray 520 that includes the first side wall 521-1 and the second side wall 521-2 where extensions 1580-1 and 1580-2 may be fit to the first side wall 521-1 and the second side wall 521-2, respectively. As shown in the example of FIG. 8, the extensions 1580-1 and 1580-2 can support respective handles 1560-1 and 1560-2.

As illustrated in various perspective views, the handle 1560-2 includes an opening 1561-2 that may be configured (e.g., sized) for gripping by a finger of a hand. As an example, the handle 1560-2 can include axels 1566-2 that define a pivot axis and that are receivable via openings 1586-2 of the extension 1580-2. Such openings may act as journals that allow for pivoting of the handle 1560-2 about its pivot axis.

As an example, an extension and a handle may include a mechanism that acts to position or retain a position of the handle with respect to the extension. For example, the handle 1560-2 includes a nub 1563-2 that may be received in a recess 1583-2 of the extension 1580-2. In such an example, the recess 1583-2 may be formed in a resilient tongue of the extension 1580-2 such that the recess 1583-2 may move (e.g., generally in an axial direction) to receive the nub 1563-2 and the release the nub 1563-2. For example, a finger may grip the handle 1560-2 via the opening 1561-2 and apply a force sufficient to release the nub 1563-2 from the recess 1583-2 of the extension 1580-2. In such an example, the handle 1560-2 may be pivoted by a number of degrees about its pivot axis such that force applied by the finger may be sufficient to translate the assembly 513 with respect to a drive tray chassis (e.g., for installation and/or removal of one or more drives).

As an example, the handle 1560-2 may include a locking mechanism or a portion of a locking mechanism. For example, consider the prong 1567-2 as being capable of contacting a portion of a drive tray chassis to thereby limit movement of the assembly 513 in the drive tray chassis. As an example, a handle may be a locking handle (e.g., a latching handle). As an example, an assembly may include one or more locking handles.

While the assembly 513 is shown with the extensions 1580-1 and 1580-2 and the handles 1560-1 and 1560-2 being operatively coupled to the drive tray 520 at an end that includes an expandable member (e.g., with one or more serpentine portions, etc.), as an example, the extensions 1580-1 and 1580-2 and the handles 1560-1 and 1560-2 may be operatively coupled to the drive tray 520 at an opposing end (e.g., an end opposite the expandable member).

In the example of FIG. 8, the handles 1560-1 and 1560-2 and the extensions 1580-1 and 1580-2 may be attachable and removable as sub-assemblies with respect to the drive tray 520. As an example, a method of assembly may include positioning the drive 150-1 in a bay of the drive tray 520 and then coupling the handles 1560-1 and 1560-2 to the drive tray 520, optionally as individual sub-assemblies that include the respective extensions 1580-1 and 1580-2.

As an example, a drive may be or include solid-state storage. For example, a drive may be a SSD, a HDD or a combination SSD and HDD.

As an example, a drive may be defined in part by a form factor. For example, a form factor may be a 3.5 inch form factor (e.g., 101.6 mm×25.4 mm×146 mm); a 2.5 inch form factor (e.g., 69.85 mm×7 to 15 mm×100 mm); a 1.8 inch form factor (e.g., 54 mm×8 mm×71 mm); or other form factor.

As an example, a connector may be an ATA connector, a Serial ATA (SATA) connector, a serial attached SCSI (SAS) connector, a SCA-2 connector, a USB connector, etc. As an example, a connector may be configured to make electrical connections via electrical conductors. As an example, a connector may be configured to make optical connection via EM energy conductors (e.g., UV, visible, IR, etc.). As an example a connector may be a waveguide connector.

As an example, an assembly can include a processor; memory accessibly by the processor; a drive tray chassis; a drive tray positioned in the drive tray chassis where the drive tray includes a first side wall, a second side wall, a member coupled to the first side wall and the second side wall that defines a dimension of a first drive bay that extends from the first side wall to the second side wall, and an intermediate member that defines a dimension of a second drive bay that extends from the intermediate member to the second side wall wherein the dimension of the second drive bay is less than the dimension of the first drive bay; and a drive accessible by the processor and positioned in one of the first drive bay and the second drive bay. In such an example, the dimension of the first drive bay may be a first drive bay width and the dimension of the second drive bay may be a second drive bay width that is less than the first bay width.

As an example, a drive tray chassis may be configured to position a drive tray in a first orientation and to position the drive tray in a second, different orientation that is rotated 180 degrees from the first orientation.

As an example, a drive tray may include a serpentine portion, for example, expandable to increase at least a dimension of a first drive bay of a drive tray that defines multiple drive bays.

As an example, a drive tray may include a bendable member and an expandable member that expands responsive to bending of the bendable member, for example, to increase a dimension of a first drive bay and a dimension of a second drive bay.

As an example, an assembly may include a rotatable handle operatively coupled to a drive tray. In such an example, the assembly may include a first releasable extension coupled to a first side wall of the drive tray and a second releasable extension coupled to a second side wall of the drive tray where the releasable extensions rotatably support the rotatable handle. As an example, a handle may include a plate and a grip that extends from the plate. In such an example, in a first orientation, the grip may be oriented in an inward direction and, in a second orientation, the grip may be oriented in a rotated direction that is rotated at least 25 degrees from the inward direction (e.g., consider about +/−45 degrees or more as appropriate to allow for finger insertion, gripping, etc.). As an example, a grip may be rotated by about 90 degrees and be limited thereto. As an example, a grip may include a stop surface, for example, formed by an edge of the grip.

As an example, an assembly can include a processor; memory accessibly by the processor; a drive tray chassis; a drive tray positioned in the drive tray chassis where the drive tray includes a first side wall, a second side wall, a bendable member coupled to the first side wall and the second side wall, an expandable member coupled to the first side wall and the second side wall, a first drive bay disposed between the first side wall and the second side wall and a second drive bay disposed between the first side wall and the second side wall where for a bent state of the bendable member the expandable member is in an expanded state that increases a dimension of the first drive bay and that increases a dimension of the second drive bay; and a drive accessible by the processor and positioned in one of the first drive bay and the second drive bay. In such an example, the expandable member may include a serpentine portion. As an example, a bendable member may include struts.

As an example, a first side wall of a drive tray may include a rail, a second side wall of the drive tray may include a rail and the rails may position the drive tray in a drive tray chassis in one of a first orientation and a second orientation where the second orientation is a 180 degree rotation of the first orientation.

As an example, an assembly may include a rotatable handle, a first releasable extension coupled to a first side wall of a drive tray and a second releasable extension coupled to a second side wall of the drive tray where the releasable extensions rotatably support the rotatable handle. In such an example, the rotatable handle can include a plate and a grip that extends from the plate where in a first orientation, the grip is oriented in an inward direction and where in a second orientation, the grip is oriented in a rotated direction that is rotated at least 25 degrees from the inward direction (e.g., consider about +/−45 degrees or more as appropriate to allow for finger insertion, gripping, etc.). As an example, a grip may be rotated by about 90 degrees and be limited thereto.

As an example, an assembly can include a processor; memory accessibly by the processor; a drive tray chassis; a drive tray positioned in the drive tray chassis wherein the drive tray includes a first side wall, a second side wall, a member coupled to the first side wall and the second side wall and a drive bay disposed between the first side wall and the second side wall; a handle rotatably supported by a first extension operatively coupled to the first side wall and rotatably supported by a second extension operatively coupled to the second side wall; and a drive accessible by the processor and positioned in the drive bay. In such an example, the handle can be rotatable about an axis that extends between the first and second extensions. As an example, the first extension may include a clip connector that operatively couples the first extension to the first side wall and the second extension may include a clip connector that operatively couples the second extension to the second side wall.

As an example, a handle can include a plate and a grip that extends from the plate where, in a first orientation, the grip is oriented in an inward direction and where in a second orientation, the grip is oriented in a rotated direction that is rotated at least 25 degrees from the inward direction (e.g., consider about +/−45 degrees or more as appropriate to allow for finger insertion, gripping, etc.). In such an example, the grip can include a stop surface that, in the first orientation, is oriented in an inward direction. As an example, a drive tray may include a plurality of drive bays. In such an example, the grip may include a stop or stops that may limit movement of a drive or drives in the drive bays. As an example, for a drive tray that includes a plurality of drive bays, at least two of the drive bays may differ in size.

As an example, a system can include a processor; memory accessible by the processor; a first connector accessible by the processor and a second connector accessible by the processor; a drive tray chassis; a drive tray positioned in the drive tray chassis in one of a first orientation and a second, different orientation that is rotated 180 degrees from the first orientation wherein the drive tray comprises a first side wall, a second side wall, a member coupled to the first side wall and the second side wall and a drive bay disposed between the first side wall and the second side wall; and a drive positioned in the drive bay where the drive includes a connector that is operatively coupled to the first connector for the first orientation of the drive tray in the drive chassis and that is operatively coupled to the second connector for the second orientation of the drive tray in the drive chassis.

As an example, a tool-less method of assembly may include expanding a width of a first drive bay and a width of a second drive bay of a drive tray that includes a first side wall and a second side wall joined by at least one crossmember; positioning a drive of a first size in the first drive bay or positioning a drive of a second, different size in the second drive bay; and supporting the drive in the drive tray. Such a method may further include coupling a rotatable handle to the drive tray.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium. As an example, a computer-readable medium may be a computer-readable medium that is not a carrier wave.

Figure 9:
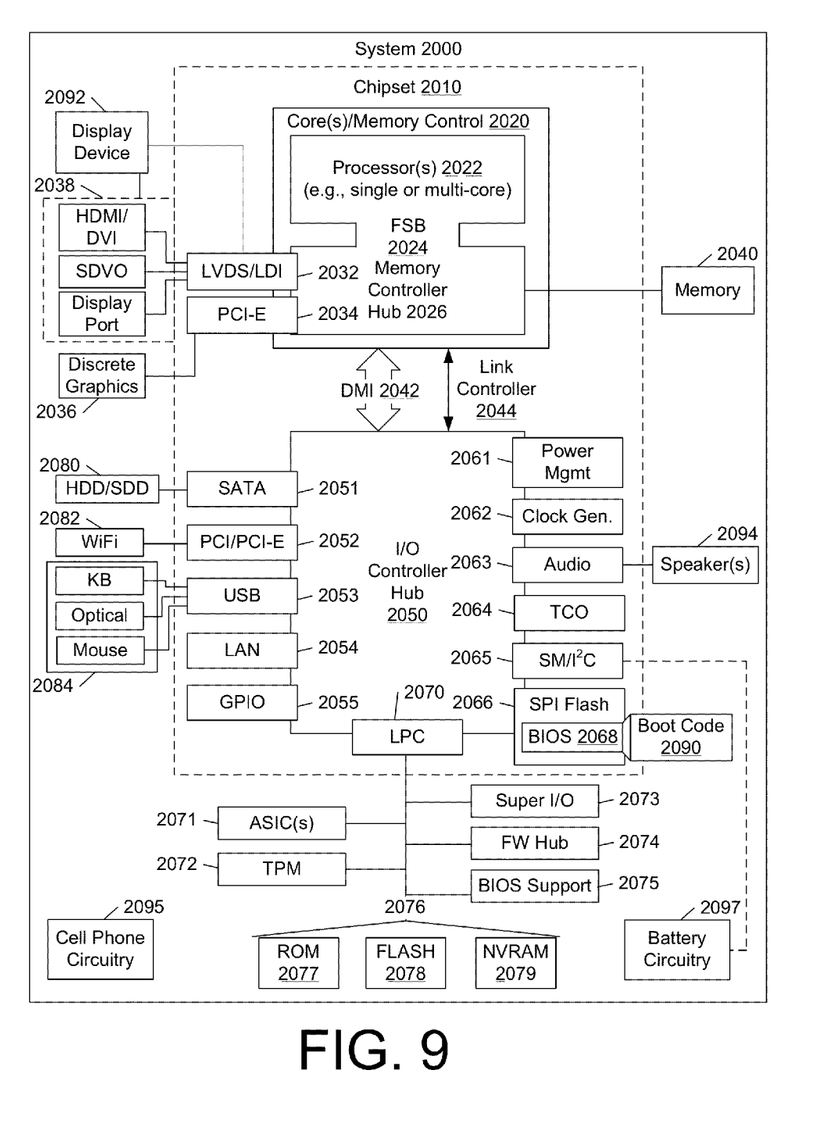
FIG. 9 is a diagram of an example of circuitry of a system, a device, etc.

While various examples of circuits or circuitry may be shown or discussed, FIG. 9 depicts a block diagram of an illustrative computer system 2000. The system 2000 may be a computer system, such as one of the ThinkCentre® or ThinkPad® series of personal computers sold by Lenovo (US) Inc. of Morrisville, N.C., or a workstation computer, such as the ThinkStation® workstation computer sold by Lenovo (US) Inc. of Morrisville, N.C.; however, as apparent from the description herein, a satellite, a base, a server or other machine may include other features or only some of the features of the system 2000 (e.g., consider the Think-Server® server sold by Lenovo (US) Inc. of Morrisville, N.C.).

As shown in FIG. 9, the system 2000 includes a so-called chipset 2010. A chipset refers to a group of integrated circuits, or chips, that are designed to work together. Chipsets are usually marketed as a single product (e.g., consider chipsets marketed under the brands INTEL®, AMD®, etc.).

In the example of FIG. 9, the chipset 2010 has a particular architecture, which may vary to some extent depending on brand or manufacturer. The architecture of the chipset 2010 includes a core and memory control group 2020 and an I/O controller hub 2050 that exchange information (e.g., data, signals, commands, etc.) via, for example, a direct management interface or direct media interface (DMI) 2042 or a link controller 2044. In the example of FIG. 9, the DMI 2042 is a chip-to-chip interface (sometimes referred to as being a link between a "northbridge" and a "southbridge").

The core and memory control group 2020 include one or more processors 2022 (e.g., single core or multi-core) and a memory controller hub 2026 that exchange information via a front side bus (FSB) 2024. As described herein, various components of the core and memory control group 2020 may be integrated onto a single processor die, for example, to make a chip that supplants the conventional "northbridge" style architecture.

The memory controller hub 2026 interfaces with memory 2040. For example, the memory controller hub 2026 may provide support for DDR SDRAM memory (e.g., DDR, DDR2, DDR3, etc.). In general, the memory 2040 is a type of random-access memory (RAM). It is often referred to as "system memory".

The memory controller hub 2026 further includes a low-voltage differential signaling interface (LVDS) 2032. The LVDS 2032 may be a so-called LVDS Display Interface (LDI) for support of a display device 2092 (e.g., a CRT, a flat panel, a projector, etc.). A block 2038 includes some examples of technologies that may be supported via the LVDS interface 2032 (e.g., serial digital video, HDMI/DVI, display port). The memory controller hub 2026 also includes one or more PCI-express interfaces (PCI-E) 2034, for example, for support of discrete graphics 2036. Discrete graphics using a PCI-E interface has become an alternative approach to an accelerated graphics port (AGP). For example, the memory controller hub 2026 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 2050 includes a variety of interfaces. The example of FIG. 9 includes a SATA interface 2051, one or more PCI-E interfaces 2052 (optionally one or more legacy PCI interfaces), one or more USB interfaces 2053, a LAN interface 2054 (more generally a network interface), a general purpose I/O interface (GPIO) 2055, a low-pin count (LPC) interface 2070, a power management interface 2061, a clock generator interface 2062, an audio interface 2063 (e.g., for speakers 2094), a total cost of operation (TCO) interface 2064, a system management bus interface (e.g., a multi-master serial computer bus interface) 2065, and a serial peripheral flash memory/controller interface (SPI Flash) 2066, which, in the example of FIG. 9, includes BIOS 2068 and boot code 2090. With respect to network connections, the I/O hub controller 2050 may include integrated gigabit Ethernet controller lines multiplexed with a PCI-E interface port. Other network features may operate independent of a PCI-E interface.

The interfaces of the I/O hub controller 2050 provide for communication with various devices, networks, etc. For example, the SATA interface 2051 provides for reading, writing or reading and writing information on one or more drives 2080 such as HDDs, SDDs or a combination thereof. The I/O hub controller 2050 may also include an advanced host controller interface (AHCI) to support one or more drives 2080. The PCI-E interface 2052 allows for wireless connections 2082 to devices, networks, etc. The USB interface 2053 provides for input devices 2084 such as keyboards (KB), one or more optical sensors, mice and various other devices (e.g., microphones, cameras, phones, storage, media players, etc.). On or more other types of sensors may optionally rely on the USB interface 2053 or another interface (e.g., $I^2C$, etc.).

In the example of FIG. 9, the LPC interface 2070 provides for use of one or more ASICs 2071, a trusted platform module (TPM) 2072, a super I/O 2073, a firmware hub 2074, BIOS support 2075 as well as various types of memory 2076 such as ROM 2077, Flash 2078, and non-volatile RAM (NVRAM) 2079. With respect to the TPM 2072, this module may be in the form of a chip that can be used to authenticate software and hardware devices. For example, a TPM may be capable of performing platform authentication and may be used to verify that a system seeking access is the expected system.

The system 2000, upon power on, may be configured to execute boot code 2090 for the BIOS 2068, as stored within the SPI Flash 2066, and thereafter processes data under the control of one or more operating systems and application software (e.g., stored in system memory 2040). An operating system may be stored in any of a variety of locations and accessed, for example, according to instructions of the BIOS 2068. Again, as described herein, a satellite, a base, a server or other machine may include fewer or more features than shown in the system 2000 of FIG. 9. Further, the system 2000 of FIG. 9 is shown as optionally including cell phone circuitry 2095, which may include GSM, CDMA, etc., types of circuitry configured for coordinated operation with one or more of the other features of the system 2000.

CONCLUSION

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. An assembly comprising:
   a processor;
   memory accessibly by the processor;
   a drive tray chassis;
   a drive tray positioned in the drive tray chassis wherein the drive tray comprises
      a first side wall,
      a second side wall,
      a bendable member coupled to the first side wall and the second side wall that defines a dimension of a first drive bay that extends from the first side wall to the second side wall,
      an intermediate member that defines a dimension of a second drive bay that extends from the intermediate member to the second side wall wherein the dimension of the second drive bay is less than the dimension of the first drive bay; and
      an expandable member that expands responsive to bending of the bendable member to increase the dimension of the first drive bay and the dimension of the second drive bay; and
   a drive accessible by the processor and positioned in one of the first drive bay and the second drive bay.

2. The assembly of claim 1 wherein the dimension of the first drive bay is a first drive bay width and wherein the dimension of the second drive bay is a second drive bay width that is less than the first bay width.

3. The assembly of claim 1 wherein the drive is a first drive positioned in the first drive bay and further comprising a second drive positioned in the second drive bay.

4. The assembly of claim 1 wherein the drive tray chassis is configured to position the drive tray in a first orientation and to position the drive tray in a second, different orientation that is rotated 180 degrees from the first orientation.

5. The assembly of claim 1 wherein the expandable member of the drive tray comprises a serpentine portion.

6. The assembly of claim 1 comprising further comprising a rotatable handle operatively coupled to the drive tray.

7. The assembly of claim 6 further comprising a first releasable extension coupled to the first side wall and a second releasable extension coupled to the second side wall wherein the releasable extensions rotatably support the rotatable handle.

8. The assembly of claim 6 wherein the rotatable handle comprises a plate and a grip that extends from the plate.

9. The assembly of claim 8 wherein in a first orientation, the grip is oriented in an inward direction and wherein in a second orientation, the grip is oriented in a rotated direction that is rotated at least 25 degrees from the inward direction.

10. An assembly comprising:
    a processor;
    memory accessibly by the processor;
    a drive tray chassis;
    a drive tray positioned in the drive tray chassis wherein the drive tray comprises
       a first side wall,
       a second side wall,
       a bendable member coupled to the first side wall and the second side wall,
       an expandable member coupled to the first side wall and the second side wall,
       a first drive bay disposed between the first side wall and the second side wall and
       a second drive bay disposed between the first side wall and the second side wall
       wherein for a bent state of the bendable member the expandable member is in an expanded state that increases a dimension of the first drive bay and that increases a dimension of the second drive bay; and
    a drive accessible by the processor and positioned in one of the first drive bay and the second drive bay.

11. The assembly of claim 10 wherein the expandable member comprises a serpentine portion.

12. The assembly of claim 10 wherein the bendable member comprises struts.

13. The assembly of claim 10 wherein the first side wall comprises a rail, wherein the second side wall comprises a rail and wherein the rails position the drive tray in the drive tray chassis in one of a first orientation and a second orientation wherein the second orientation is a 180 degree rotation of the first orientation.

14. The assembly of claim 10 comprising further comprising a rotatable handle operatively coupled to the drive tray.

15. The assembly of claim 14 further comprising a first releasable extension coupled to the first side wall and a second releasable extension coupled to the second side wall wherein the releasable extensions rotatably support the rotatable handle.

16. The assembly of claim 14 wherein the rotatable handle comprises a plate and a grip that extends from the plate wherein in a first orientation, the grip is oriented in an inward direction and wherein in a second orientation, the grip is oriented in a rotated direction that is rotated at least 25 degrees from the inward direction.

17. An assembly comprising: a processor; memory accessibly by the processor; a drive tray chassis; a drive tray positioned in the drive tray chassis wherein the drive tray comprises a first side wall, a second side wall, a member coupled to the first side wall and the second side wall that defines a dimension of a first drive bay that extends from the first side wall to the second side wall wherein the member comprises a serpentine portion, wherein the serpentine portion is expandable to increase at least the dimension of the first drive bay, and an intermediate member that defines a dimension of a second drive bay that extends from the intermediate member to the second side wall wherein the dimension of the second drive bay is less than the dimension of the first drive bay; and a drive accessible by the processor and positioned in one of the first drive bay and the second drive bay.

18. An assembly comprising: a processor; memory accessibly by the processor; a drive tray chassis; a drive tray positioned in the drive tray chassis wherein the drive tray comprises a first side wall, a second side wall, a member coupled to the first side wall and the second side wall that defines a dimension of a first drive bay that extends from the first side wall to the second side wall, and an intermediate member that defines a dimension of a second drive bay that extends from the intermediate member to the second side wall wherein the dimension of the second drive bay is less than the dimension of the first drive bay, and wherein the member comprises a serpentine member, wherein the serpentine member is expandable to increase at least the dimension of the first drive bay; and a drive accessible by the processor and positioned in one of the first drive bay and the second drive bay.

* * * * *